United States Patent
Kim et al.

(10) Patent No.: US 10,574,917 B2
(45) Date of Patent: Feb. 25, 2020

(54) PIXEL OUTPUT LEVEL CONTROL DEVICE AND CMOS IMAGE SENSOR USING THE SAME

(71) Applicant: SK hynix Inc., Gyeonggi-do (KR)

(72) Inventors: Tae-Hoon Kim, Gyeonggi-do (KR); Woong-Hee Lee, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/401,846

(22) Filed: May 2, 2019

(65) Prior Publication Data

US 2019/0260955 A1 Aug. 22, 2019

Related U.S. Application Data

(62) Division of application No. 15/291,864, filed on Oct. 12, 2016, now Pat. No. 10,321,080.

(30) Foreign Application Priority Data

Mar. 25, 2016 (KR) ........................ 10-2016-0035913

(51) Int. Cl.
| | | |
|---|---|---|
| *H04N 5/3745* | (2011.01) | |
| *H04N 5/378* | (2011.01) | |
| *H04N 5/369* | (2011.01) | |
| *H04N 5/376* | (2011.01) | |
| *H04N 5/365* | (2011.01) | |

(52) U.S. Cl.
CPC ......... *H04N 5/3745* (2013.01); *H04N 5/3698* (2013.01); *H04N 5/378* (2013.01); *H04N 5/3765* (2013.01); *H04N 5/3658* (2013.01)

(58) Field of Classification Search
CPC .... H04N 5/3745; H04N 5/378; H04N 5/3765; H04N 5/3698; H04N 5/3658
See application file for complete search history.

(56) References Cited

U.S. PATENT DOCUMENTS

| | | |
|---|---|---|
| 2010/0315540 A1 | 12/2010 | Hoshino |
| 2011/0234872 A1 | 9/2011 | Nakamura |
| 2012/0092532 A1 | 4/2012 | Ladd et al. |

FOREIGN PATENT DOCUMENTS

CN 1871791 11/2006

OTHER PUBLICATIONS

Office Action issued by the Chinese Intellectual Property Office dated Jul. 26, 2019.

*Primary Examiner* — Mekonnen D Dagnew
(74) *Attorney, Agent, or Firm* — IP & T Group LLP (57) ABSTRACT

A pixel output level control device may include: a pixel output level control unit suitable for controlling a pixel output level of a pixel signal of a pixel for reducing the time required for settling the pixel signal during a specific period; and a pixel output level retention unit suitable for maintaining the pixel output level of the pixel signal during the specific period to a fixed value, according to control of the pixel output level control unit.

12 Claims, 5 Drawing Sheets

PIXEL OUTPUT LEVEL CONTROL DEVICE AND CMOS IMAGE SENSOR USING THE SAME

CROSS-REFERENCE TO RELATED APPLICATIONS

This application is a division of U.S. patent application Ser. No. 15/291,864 filed on Oct. 12, 2016, which claims priority of Korean Patent Application No. 10-2016-0035913, filed on Mar. 25, 2016. The disclosure of each of the foregoing applications is incorporated herein by reference in its entirety.

BACKGROUND

1. Field

Exemplary embodiments of the present invention relate to a complementary metal-oxide-semiconductor (CMOS) image sensor (CIS) and, more particularly, to an improved pixel output level control device and a CMOS image sensor using the same.

2. Description of the Related Art

When the size of a pixel array of a CMOS image sensor is increased, one row line readout time required for satisfying a predetermined frame rate (e.g., 30 frames per second (FPS)) is decreased, which makes it difficult to secure a sufficient transfer time for a pixel signal. Furthermore, the increase in size of the pixel array increases the loading capacitance of a pixel output line. Thus, the time during which a pixel signal outputted from a pixel is transferred to an input terminal of a readout device is inevitably increased.

For this reason, when the time during which a pixel signal outputted from a pixel is transferred to the input terminal of the readout device is not sufficiently secured, the pixel signal may not be settled. When the pixel signal is not settled, an image quality may be degraded. That is, since each column line has a slightly different loading capacitance and each pixel bias circuit has a slightly different size, fixed pattern noise (FPN) may occur across the column lines in case where the pixel signal is not settled, thereby degrading an image quality. Since the FPN is visually outstanding, the FPN must be eliminated.

SUMMARY

Various embodiments are directed to an improved pixel output level control device for a CIS. The pixel output level control device may secure a sufficient transmission time for transmitting a pixel signal from a pixel to an input terminal and may ensure that the pixel signal is settled. The pixel output level control device may reduce the time during which a pixel signal generated from a pixel is transferred to an input terminal of a readout device.

Another aspect of the present invention is directed to CIS employing the pixel output level control device.

In an embodiment, a pixel output level control device may comprise a pixel output level control unit suitable for controlling a pixel output level of a pixel signal of a pixel for reducing the time required for settling the pixel signal during a specific period; and a pixel output level retention unit suitable for maintaining the pixel output level of the pixel signal during the specific period to a fixed value, according to control of the pixel output level control unit. The specific period may comprise a period in which a transfer signal may be activated and a cell select signal may be deactivated, and the fixed value may be the same or substantially the same to a pixel output level when the pixel may be reset. The pixel output level control unit may generate an inverted cell select signal and transfers the inverted cell select signal to the pixel output level retention unit, the inverted cell select signal having an inverted timing with respect to a cell select signal. The pixel output level retention unit may comprise a plurality of first source follower circuits, each of the first source follower circuits being suitable for operation according to an inverted cell select signal from the pixel output level control unit. Each of the first source follower circuits may comprise an NMOS-type transistor which has a drain terminal suitable for receiving a supply voltage, a gate terminal suitable for receiving the inverted cell select signal from the pixel output level control unit, and a source terminal suitable for coupling to a column line of a complementary metal-oxide-semiconductor (CMOS) image sensor (CIS).

In another embodiment, a complementary metal-oxide-semiconductor (CMOS) image sensor (CIS) may comprise a pixel array suitable for outputting a pixel signal corresponding to incident light; a row decoder suitable for selecting and controlling a pixel within the pixel array for each row line, according to control of a control unit; a pixel biasing unit suitable for biasing the pixel signal outputted from the pixel array; a ramp signal generator suitable for generating a ramp signal according to control of the control unit; a pixel output level control device suitable for controlling and maintaining a pixel output level during a period in which a transfer signal may be activated and a cell select signal may be deactivated; a comparison unit suitable for comparing each pixel signal applied from the pixel array with the ramp signal applied from the ramp signal generator; a counting unit suitable for counting a clock applied from the control unit according to each output signal from the comparison unit; a memory unit suitable for storing the counting information provided from the counting unit according to control of the control unit; the control unit suitable for controlling the operations of the row decoder, the ramp signal generator, the counting unit, the memory unit and a column readout circuit; and the column readout circuit suitable for outputting data of the memory unit according to control of the control unit. The pixel output level control device may comprise a pixel output level control unit suitable for controlling the pixel output level during the period; and a pixel output level retention unit suitable for maintaining the pixel output level during the period, according to control of the pixel output level control unit. The pixel output level control unit may generate an inverted cell select signal and transfers the inverted cell select signal to the pixel output level retention unit, the inverted cell select signal having an inverted timing with respect to a cell select signal. The pixel output level retention unit may comprise a plurality of first source follower circuits, each of the first source follower circuits may be installed at each column line and operated according to an inverted cell select signal from the pixel output level control unit. Each of the first source follower circuits may comprise an NMOS-type transistor which has a drain terminal configured to receive a supply voltage, a gate terminal configured to receive the inverted cell select signal from the pixel output level control unit, and a source terminal coupled to the column line.

In another embodiment, a pixel output level control device may comprise a pixel output level control unit suitable for controlling a pixel output level during a specific period; a signal transfer unit suitable for buffering a dummy pixel output signal and transferring the buffered signal; and a pixel output level retention unit suitable for maintaining the pixel output level during the specific period, according to the dummy pixel output signal from the signal transfer unit and an inverted cell select signal from the pixel output level control unit. The specific period may comprise a period in which a transfer signal may be activated and a cell select signal may be deactivated. The pixel output level control unit may generate an inverted cell select signal and transfers the inverted cell select signal to the pixel output level retention unit, the inverted cell select signal having an inverted timing with respect to a cell select signal. The signal transfer unit may comprise an analog buffer which buffers the dummy pixel output signal outputted from a second source follower circuit included in a dummy pixel and transfers the buffered signal to a drain terminal of a first source follower circuit included in the pixel output level retention unit. The pixel output level retention unit may comprise a plurality of first source follower circuits, each of the first source follower circuits may be installed at each column line and operated according to the dummy pixel output signal from the signal transfer unit and an inverted cell select signal from the pixel output level control unit. Each of the first source follower circuits may comprise an NMOS-type transistor which has a drain terminal configured to receive the dummy pixel output signal from the signal transfer unit, a gate terminal configured to receive the inverted cell select signal from the pixel output level control unit, and a source terminal coupled to the column line.

In another embodiment, a complementary metal-oxide-semiconductor (CMOS) image sensor (CIS) may comprise a pixel array suitable for outputting a pixel signal corresponding to incident light; a row decoder suitable for selecting and controlling a pixel within the pixel array for each row line, according to control of a control unit; a pixel biasing unit suitable for biasing the pixel signal outputted from the pixel array; a ramp signal generator suitable for generating a ramp signal according to control of the control unit; a pixel output level control device suitable for controlling and maintaining a pixel output level during a period in which a transfer signal may be activated and a cell select signal may be deactivated, using an inverted cell select signal and a dummy pixel output signal; a comparison unit suitable for comparing each pixel signal outputted from the pixel array with the ramp signal provided from the ramp signal generator; a counting unit suitable for counting a clock applied from the control unit according to each output signal from the comparison unit; a memory unit suitable for storing the counting information provided from the counting unit according to control of the control unit; the control unit suitable for controlling the operations of the row decoder, the ramp signal generator, the counting unit, the memory unit and a column readout circuit; and the column readout circuit suitable for outputting data of the memory unit according to control of the control unit. The pixel output level control device may comprise: a pixel output level control unit suitable for controlling the pixel output level during the period; a signal transfer unit suitable for buffering a dummy pixel output signal and transferring the buffered signal; and a pixel output level retention unit suitable for maintaining the pixel output level during the period, according to the dummy pixel output signal from the signal transfer unit and an inverted cell select signal from the pixel output level control unit. The pixel output level control unit may generate an inverted cell select signal and transfers the inverted cell select signal to the pixel output level retention unit, the inverted cell select signal having an inverted timing with respect to a cell select signal. The signal transfer unit may comprise an analog buffer which buffers the dummy pixel output signal outputted from a second source follower circuit included in a dummy pixel, and transfers the buffered signal to a drain terminal of a first source follower circuit included in the pixel output level retention unit. The pixel output level retention unit may comprise a plurality of first source follower circuits, each of the first source follower circuits may be installed at each column line and operated according to the dummy pixel output signal from the signal transfer unit and an inverted cell select signal from the pixel output level control unit. Each of the first source follower circuits may comprise an NMOS-type transistor which has a drain terminal configured to receive the dummy pixel output signal from the signal transfer unit, a gate terminal configured to receive the inverted cell select signal from the pixel output level control unit, and a source terminal coupled to the column line.

BRIEF DESCRIPTION OF THE DRAWINGS

The above and other features and advantages of the present invention will become more apparent to those skilled in the relevant art by the following detailed description with reference to the attached drawings in which.

DETAILED DESCRIPTION

Various embodiments will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

The drawings are not necessarily to scale and, in some instances, proportions may have been exaggerated in order to more clearly illustrate the various elements of the embodiments. For example, in the drawings, the size of elements and the intervals between elements may be exaggerated compared to actual sizes and intervals for convenience of illustration.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, an element (also referred to as a feature) described in connection with one embodiment may be used singly or in combination with other elements of another embodiment, unless specifically indicated otherwise.

Figure 1A:
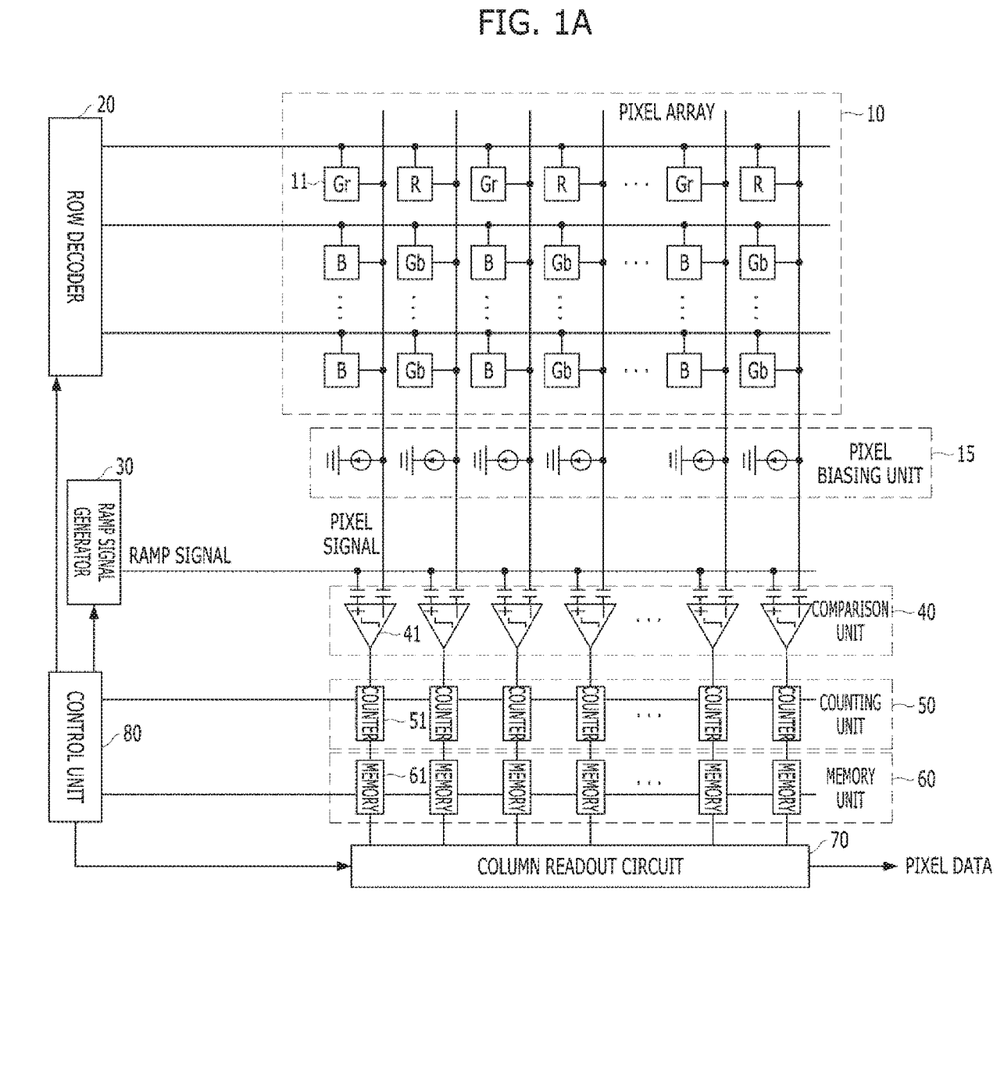
FIG. 1A is a configuration diagram of a CIS.

FIG. 1A is a configuration diagram of a CMOS image sensor (CIS).

Referring to FIG. 1A, the CIS may include a pixel array 10, a row decoder 20, a pixel biasing unit 15, a ramp signal generator 30, a comparison unit 40, a counting unit 50, a memory unit 60, and a column readout circuit 70 and a control unit 80. Each pixel in the pixel array 10 may output a pixel signal corresponding to incident light. The row decoder 20 may select pixels in the pixel array 10 according to row lines under the control of the control unit 80 (for example, timing generator), and may control the operation of the selected pixels. The pixel biasing unit 15 may bias a pixel signal provided from the pixel array 10. The ramp signal generator 30 may generate a ramp signal according to control of the control unit 80. The comparison unit 40 may compare the value of each pixel signal outputted from the pixel array 10 through the pixel biasing unit 15 with the value of the ramp signal applied from the ramp signal generator 30. The counting unit 50 may count a clock applied from the control unit 80 according to each output signal of the comparison unit 40. The memory unit 60 may store the counting information provided from the counting unit 50 according to control of the control unit 80. The control unit 80 may control the operations of the row decoder 20, the ramp signal generator 30, the counting unit 50, the memory unit 60 and the column readout circuit 70. The column readout circuit 70 may sequentially output data of the memory unit 60 as pixel data PXDATA according to control of the control unit 80.

At this time, in order to eliminate an offset value of each pixel, the CIS may compare pixel signals (i.e., pixel output voltages) before and after a light signal is incident, and measure only the pixel signal generated by the incident light. Such a technique is referred to as Correlated Double Sampling (CDS). The CDS operation may be performed by the comparison unit 40.

The comparison unit 40 may include a plurality of comparators, the counting unit 50 may include a plurality of counters, and the memory unit 60 may include a plurality of memories which are arranged in columns so that each column has one comparator, one counter, and one memory coupled in series in the recited order. That is, a pixel signal generated by the pixel array is processed in a sequential manner by a comparator, a counter and a memory corresponding to each column of the pixel array 10.

Next, an operation, namely an analog-digital conversion operation of a pixel signal through one comparator, one counter and one memory in a column will be described as an example.

Accordingly, in operation, a first comparator 41 among the plurality of comparators of the comparison unit 40 may receive a pixel signal VPIXEL which is outputted from a first column of the pixel array 10 through one terminal thereof, and may receive a ramp signal VRAMP which is applied from the ramp signal generator 30 through the other terminal thereof. Then, the comparator 41 may compare the values of the two signals and output a comparison signal.

Since the ramp signal VRAMP has a voltage level that falls or rises with time, the values of the two signals inputted to each comparator may coincide with each other at a certain time point. After the point of time that the values of the two signals, i.e., the pixel signal and the ramp signal coincide with each other, the value of the comparison signal outputted from each comparator is inverted. The same operation is performed by each of the plurality of comparators in the comparison unit 40 for the pixel signals received from each column of the pixel array.

Then, returning to the description of the operation of the first column of the CIS of FIG. 1, a first counter 51 among the plurality of counters in the counting unit 50, may count a clock provided from the control unit 80 from the point of time that the ramp signal falls or rises to the point of time that the comparison signal outputted from the comparator 41 is inverted, and output the counting information. The same operation is performed by each of the plurality of counters in the counting unit 50 for the comparison signals received from each column comparator. Each of the counters may be reset according to a reset signal from the control unit 80.

Then, a first memory 61 among the plurality of memories in the memory unit 60 may store the counting information outputted from the counter 51 according to a load signal from the control unit 80, and output the stored counting information to the column readout circuit 70.

Figure 1B:
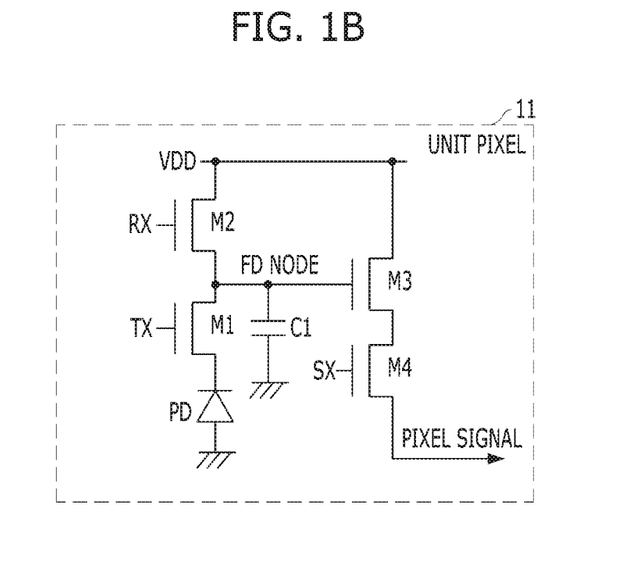
FIG. 1B is a circuit diagram of a unit pixel.

FIG. 1B is a circuit diagram of a unit pixel 11.

Referring to FIG. 1B, the unit pixel 11 may include a photodiode PD, a transfer transistor M1, a floating diffusion node FD, a reset transistor M2, a conversion transistor M3 and a select transistor M4. Conversion transistor M3 may also be referred to as a drive transistor M3.

The photodiode PD may be any suitable photoelectric conversion element. The photodiode PD may perform a photoelectric conversion function for converting a received incident light to electric charges. The photodiode PD may be, for example, at least one of a photo transistor, a photo gate, and a pinned photodiode.

The transfer transistor M1 may transfer the electric charges in the photodiode PD coupled to one terminal thereof to a floating diffusion (FD) node coupled to the other terminal thereof, in response to a transfer signal Tx applied to a gate terminal thereof.

The reset transistor M2 may transfer a drain voltage VDD applied to one terminal thereof to the FD node coupled to the other terminal thereof, in response to a reset signal RX applied to a gate terminal thereof. The drain voltage VDD may serve as a reset voltage from the point of view of the reset transistor M2.

The conversion transistor (e.g., a source follower transistor) M3 may have one terminal coupled to the drain voltage VDD and a second terminal thereof coupled to one terminal of the select transistor M4. The conversion transistor M3 may generate an electrical signal corresponding to electric charges accumulated in the FD node which is coupled to a gate terminal of the conversion transistor M3. The conversion transistor M3 then outputs the generated electrical signal to the select transistor M4 which is couple to the other terminal of the conversion transistor M3.

The selection transistor M4 may be operated in response to a cell select signal SX applied to a gate terminal thereof, and output the electrical signal applied to one terminal thereof from the conversion transistor M3 as a pixel signal through the other terminal thereof.

The FD node is a diffusion region to which the other terminals of the transfer transistor M1 and the reset transistor M2 are commonly coupled. Since electric charges corresponding to an image signal or electric charges corresponding to a reset voltage are accumulated in the floating diffusion region, the FD node may be modeled as a capacitor C1 having one of its terminals grounded and its other terminal coupled to the FD node.

Electric charges corresponding to the drain voltage (i.e., reset voltage) VDD inputted through the reset transistor M2 may be stored in the FD node. That is, the reset transistor M2 may be turned on to reset the FD node. Then, the transfer transistor M1 may be turned on to transfer electric charges corresponding to an image signal provided from the photodiode PD to the FD node.

Figure 1C:
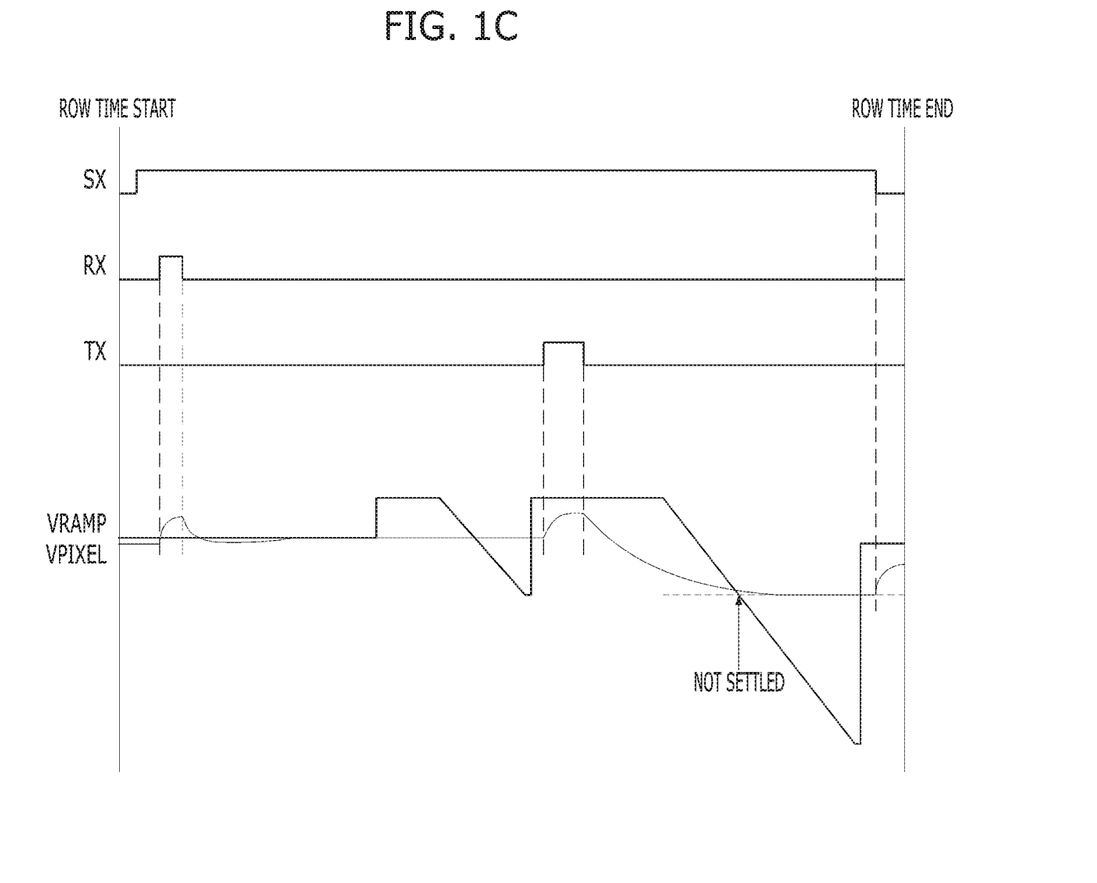
FIG. 1C is a timing diagram illustrating the readout timing of the CIS of FIGS. 1A and 1B.

FIG. 1C is a timing diagram illustrating a readout timing of a CMOS image sensor (CIS) such as the one illustrated in FIG. 1.

First, operation of the pixel of FIG. 1B will be described. After electric charges are stored in the FD node by activating the transfer signal Tx to a high logic level, a pixel output level (output voltage level of the pixel signal) rises, and settling may be performed. Typically, a long time is required for settling the signal to a fixed level. Settling of a signal means that a voltage level of the signal gradually changes to a fixed level. Thus, a settled signal is a signal that has obtained a substantially fixed (or constant) voltage level.

More specifically, the transfer transistor M1 is enabled by the transfer signal Tx having the high logic level in order to transfer electric charges accumulated in the photodiode PD to the FD node. At this time, the voltage of the FD node is raised and then returns to the original state. Conventionally, since the transfer transistor M1 is enabled to transfer charges while the selection transistor M4 is enabled, a high voltage is applied to the cell select signal SX. In this case, as the voltage of the FD node rises, the pixel output level may also rise. Furthermore, quite a long time may be required for settling the pixel signal after electric charges are transferred.

As such, when the pixel signal is not settled, image degradation may occur due to a difference between parasitic capacitors and a current difference between the pixel bias circuits at the respective column lines. That is, since the parasitic capacitor difference and the current difference caused by pixel bias TR mismatching generate fixed pattern noise (FPN) across the column lines, the image may be degraded. Since the FPN is visually outstanding, the FPN must be eliminated.

The present embodiment can secure a sufficient time to transfer a pixel signal outputted from a pixel to an input terminal of a readout circuit, thereby ensuring settling the pixel signal. Thus, the present embodiment can prevent the occurrence of FPN across column lines, and prevent image degradation. The present embodiment will be described in detail with reference to FIGS. 2A to 2C.

Figure 2A:
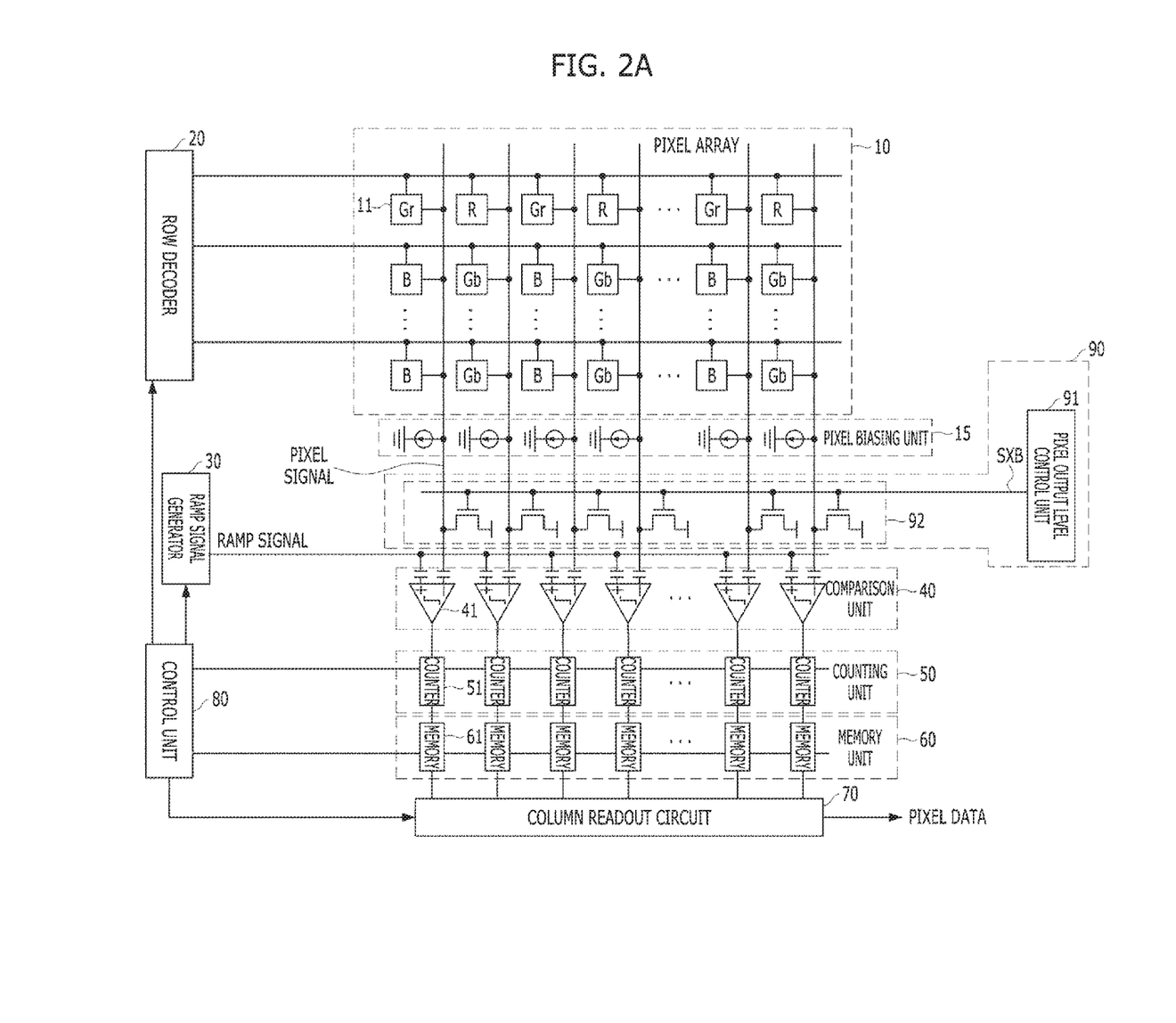
FIG. 2A is a configuration diagram illustrating a pixel output level control device and a CMOS image sensor (CIS) using the same in accordance with an embodiment of the present invention.
Figure 2B:
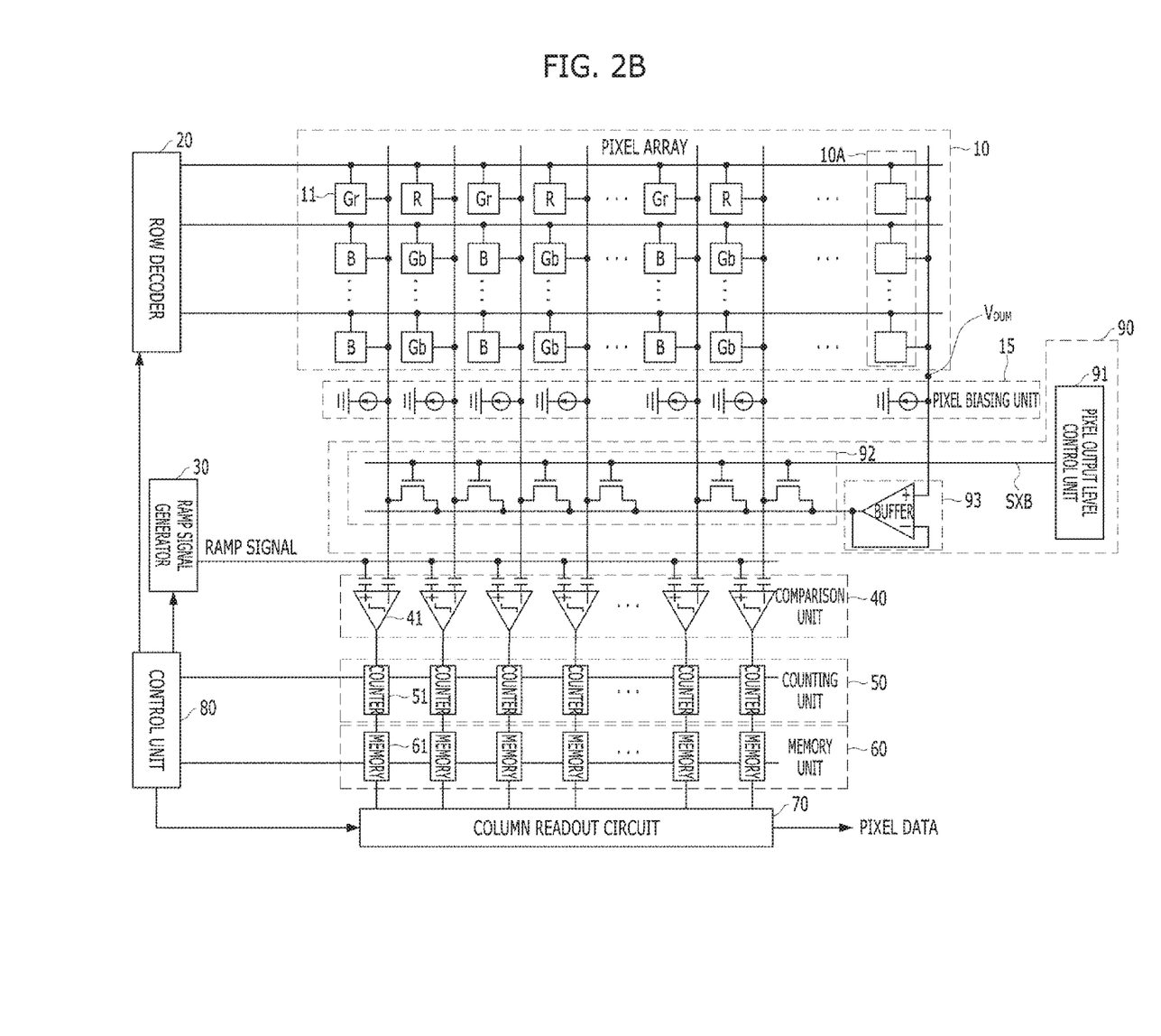
FIG. 2B is a configuration diagram illustrating a pixel output level control device and a CMOS image sensor (CIS) using the same in accordance with another embodiment of the present invention.
Figure 2C:
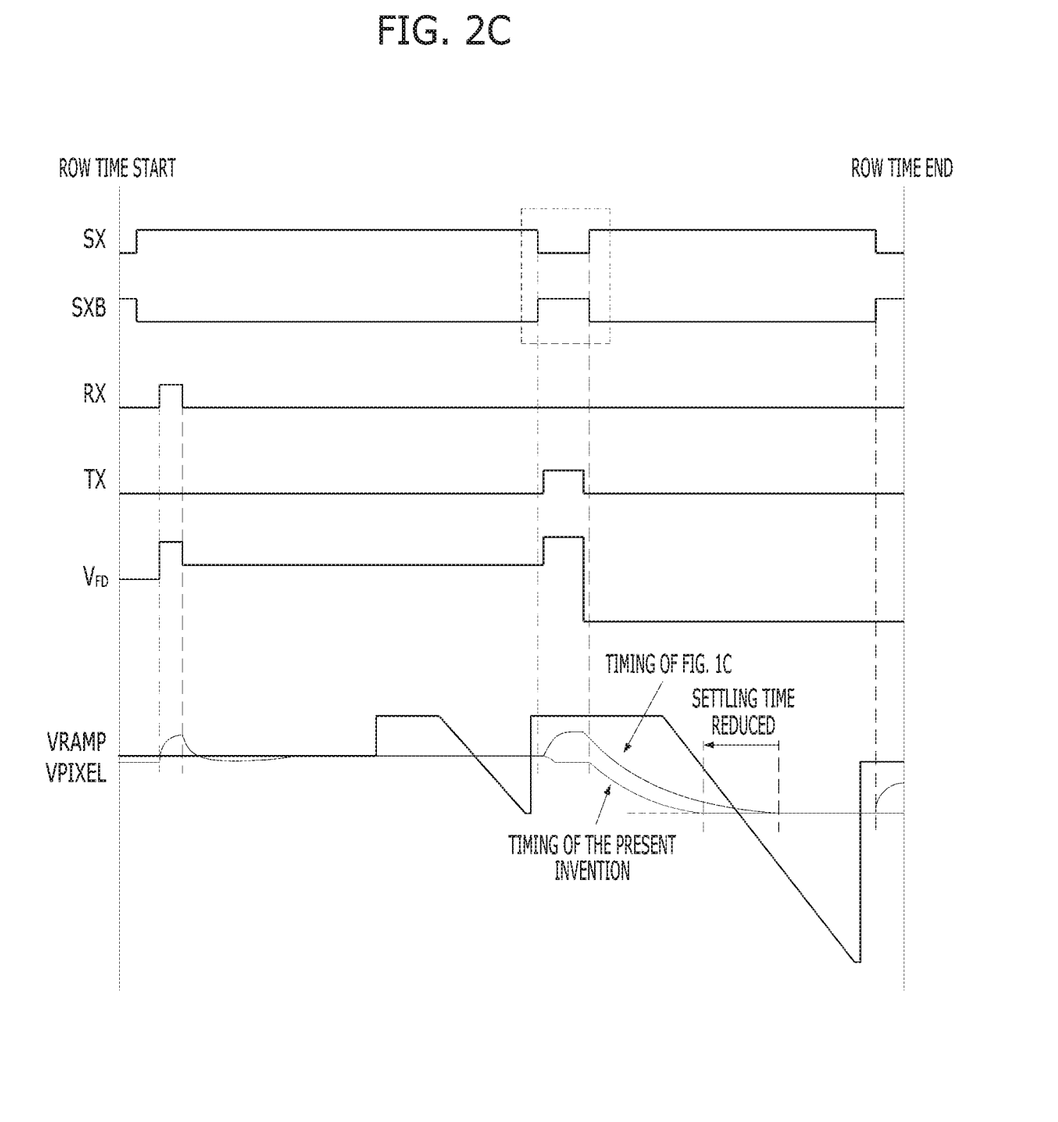
FIG. 2C is a timing diagram illustrating a readout timing of a pixel output level control device and a CMOS image sensor (CIS) using the same in accordance with an embodiment of the present invention.

FIG. 2A is a configuration diagram illustrating a pixel output level control device and a CMOS image sensor (CIS) using the same in accordance with an embodiment of the present invention. FIG. 2B is a configuration diagram illustrating a pixel output level control device and a CMOS image sensor (CIS) using the same in accordance with another embodiment of the present invention. FIG. 2C is a timing diagram illustrating a readout timing of the pixel output level control device and the CMOS image sensor (CIS) using the same in accordance with an embodiment of the present invention.

Referring to FIG. 2A, the CMOS image sensor (CIS) may include a pixel array 10, a row decoder 20, a pixel biasing unit 15, a ramp signal generator 30, a comparison unit 40, a counting unit 50, a memory unit 60, a column readout circuit 70, a control unit 80 and a pixel output level control device 90. The pixel array 10 may output a pixel signal corresponding to incident light. The row decoder 20 may select pixels in the pixel array 10 according to row lines under the control of the control unit 80 (for example, timing generator), and may control the operation of the selected pixels. The pixel biasing unit 15 may bias a pixel signal provided from the pixel array 10. The ramp signal generator 30 may generate a ramp signal according to control of the control unit 80. The pixel output level control device 90 may control and maintain a pixel output level during a period in which a transfer signal TX is activated and a cell select signal SX is deactivated. The comparison unit 40 may compare the value of each pixel signal outputted from the pixel array 10 through the pixel biasing unit 15 and the pixel output level control device 90 with a value of the ramp signal applied from the ramp signal generator 30. The counting unit 50 may count a clock applied from the control unit 80 according to each output signal of the comparison unit 40. The memory unit 60 may store the counting information provided from the counting unit 50 according to control of the control unit 80. The control unit 80 may control the operations of the row decoder 20, the ramp signal generator 30, the counting unit 50, the memory unit 60 and the column readout circuit 70. The column readout circuit 70 may sequentially output data of the memory unit 60 as pixel data PXDATA according to control of the control unit 80.

The configuration of the pixel output level control device 90 in FIG. 2A will be described in more detail as follows. Since the other components are configured in the same manner as those of FIG. 1A, the detailed descriptions thereof are omitted herein.

The pixel output level control device 90 may include a pixel output level control unit 91 and a pixel output level retention unit 92. The pixel output level control unit 91 may control a pixel output level during a specific period in which a transfer signal TX is activated and a cell select signal SX is deactivated. The pixel output level retention unit 92 may maintain the pixel output level during the period in which the transfer signal TX is activated and the cell select signal SX is deactivated, according to the control of the pixel output level control unit 91.

The pixel output level control unit 91 may generate an inverted cell select signal SXB having an inverted timing with respect to the cell select signal SX, and transfer the inverted cell select signal SXB as an input voltage to the pixel output level retention unit 92. The pixel output level control unit 91 may be implemented as a separate block as illustrated in FIG. 2A, but implemented in the control unit 80.

The pixel output level retention unit 92 may include a plurality of transistors as a plurality of first source follower circuits. Each of the first source follower circuits is installed at each column and operated according to the inverted cell select signal SXB from the pixel output level control unit 91. For example, as illustrated in the embodiment of FIG. 2A, the first source follower circuit may be implemented with an NMOS-type transistor which has a drain terminal configured to receive a supply voltage, a gate terminal configured to receive the inverted cell select signal SXB from the pixel output level control unit 91, and a source terminal coupled to the column line.

The operation of the pixel output level control device 90 will be described as follows. While the transfer signal TX is enabled to transfer electric charges to the FD node of FIG. 1B, the selection transistor M4 may be turned off to prevent a variation of the pixel output level due to a change in voltage of the FD node. However, since the selection transistor M4 is turned off, a separate method for maintaining the pixel output level is required. Thus, in order to maintain the pixel output level, the first source follower circuit for setting a similar output level to a second source follower circuit M3 of the unit pixel 11 may be added to each column. The first source follower circuit may use the inverted cell select signal SXB as an input voltage, the inverted cell select signal SXB having the inverted timing of the cell select signal SX. When the second source follower circuit M3 of the unit pixel 11 is turned off, the first source follower circuit may be turned on by the inverted cell select signal SXB. When the second source follower circuit M3 of the unit pixel 11 is turned on, the first source follower circuit may be turned off by the inverted cell select signal SXB. Then, the pixel output level may be maintained at a level that is similar to the pixel output level when the pixel is reset.

Referring to FIG. 2B, a CMOS image sensor (CIS) may include a pixel array 10, a row decoder 20, a pixel biasing unit 15, a ramp signal generator 30, a comparison unit 40, a counting unit 50, a memory unit 60, a column readout circuit 70, a control unit 80 and a pixel output level control device 90. The pixel array 10 may output a pixel signal corresponding to incident light. The pixel array 10 may include a dummy pixel unit 10A for outputting a dummy pixel output signal VDUM. The row decoder 20 may select pixels in the pixel array 10 according to row lines under the control of the control unit 80 (for example, timing generator), and may control the operation of the selected pixels. The pixel biasing unit 15 may bias a pixel signal provided from the pixel array 10. The ramp signal generator 30 may generate a ramp signal according to control of the control unit 80. The pixel output level control device 90 may control and maintain a pixel output level during a period in which a transfer signal TX is activated and a cell select signal SX is deactivated, using an inverted cell select signal SXB and the dummy pixel output signal VDUM. The comparison unit 40 may compare the value of each pixel signal outputted from the pixel array 10 through the pixel biasing unit 15 and the pixel output level control device 90 with the value of the ramp signal applied from the ramp signal generator 30. The counting unit 50 may count a clock applied from the control unit 80 according to each output signal of the comparison unit 40. The memory unit 60 may store the counting information provided from the counting unit 50 according to control of the control unit 80. The control unit 80 may control the operations of the row decoder 20, the ramp signal generator 30, the counting unit 50, the memory unit 60 and the column readout circuit 70. The column readout circuit 70 may sequentially output data of the memory unit 60 as pixel data PXDATA according to control of the control unit 80.

The configuration of the pixel output level control device 90 of FIG. 2B will be described in more detail as follows. Since the other components are configured in the same manner as those of FIG. 1A, the detailed descriptions thereof are omitted herein.

Referring to FIG. 2B, the pixel output level control device 90 may include a pixel output level control unit 91, a pixel output level retention unit 92 and a signal transfer unit 93. The pixel output level control unit 91 may control a pixel output level during a specific period in which the transfer signal TX is activated and the cell select signal SX is deactivated. The signal transfer unit 93 may buffer and transfer the dummy pixel output signal VDUM. The pixel output level retention unit 92 may maintain the pixel output level during the period in which the transfer signal TX is activated and the cell select signal SX is deactivated, according to the dumpy pixel output signal VDUM from the signal transfer unit 93 and the inverted cell select signal SXB from the pixel output level control unit 91.

Since the pixel output level control unit 91 is configured in the same manner as described with reference to FIG. 2A, the detailed descriptions thereof are omitted herein.

The signal transfer unit 93 may include an operational (OP) amplifier as an analog buffer by receiving the dummy pixel output signal VDUM through a positive terminal (+) and receiving an output signal from the signal transfer unit 93 through a negative terminal (−). Accordingly, the signal transfer unit 93 may buffer a dummy pixel output signal VDUM outputted from a second source follower circuit M3 of a dummy pixel, and transfer the buffered signal to the drain terminal of the first source follower circuit of the pixel output level retention unit 92.

The pixel output level retention unit 92 may include a plurality of transistors as a plurality of first source follower circuits. Each of the first source follower circuit which is installed at each column and operated according to the dummy pixel output signal VDUM from the signal transfer unit 93 and the inverted cell select signal SXB from the pixel output level control unit 91. At this time, the first source follower circuit may be implemented with an NMOS-type transistor which has a drain terminal configured to receive the dummy pixel output signal VDUM from the signal transfer unit 93, a gate terminal configured to receive the inverted cell select signal SXB from the pixel output level control unit 91, and a source terminal coupled to the column line.

In the present embodiment, when the dummy pixel output signal VDUM from the second source follower circuit M3 of the dummy pixel is transferred to all column lines through the analog buffer, the pixel output level can be maintained at the same level as the output level when the pixel is reset. Thus, the settling time of the pixel signal may be minimized.

More specifically, it may be difficult to arrange the NMOS-type first source follower circuit at each column line, the first source follower circuit having the same characteristic as the second source follower circuit M3 of the unit pixel 11. Thus, when the output level of the second source follower circuit M3 of the unit pixel 11 is adjusted to the same level as the output level of the first source follower circuit according to the inverted cell select signal SXB, the settling time of the pixel signal can be minimized. To reduce the settling time, the analog buffer of which the input has the output level of the second source follower circuit M3 of the dummy pixel arranged in the dummy column line of the pixel array may be added to transfer the dummy pixel output signal VDUM from the second source follower circuit M3 of the dummy pixel to all of the column lines. Then, the same output level as the second source follower circuit M3 of the dummy pixel can be maintained while the selection transistor M4 of FIG. 1B is turned off.

Referring to FIG. 2C, a readout timing will be described. While the transfer signal TX is activated, the select signal SX is deactivated do that the selection transistor M4 of FIG. 1B is turned off to prevent an increase of the pixel output level. Furthermore, the inverted cell select signal SXB having the inverted timing of the cell select signal SX and the NMOS-type first source follower circuit using the inverted cell select signal SXB as an input voltage may be applied to maintain a similar pixel output level to or the same pixel output level as the output level when the pixel is reset, even while the selection transistor M4 is turned off. Thus, the settling time of the pixel signal can be considerably reduced.

In accordance with the present embodiments, the pixel output level control device and the CIS can secure a sufficient time required for transferring a pixel signal outputted from a pixel to the input terminal of the readout device, thereby reducing the settling time of the pixel signal.

Furthermore, as the pixel signal is settled, the pixel output level control device and the CIS can secure prevent the occurrence of FPN across the column lines, thereby preventing image degradation.

Furthermore, an additional timing margin can be secured for one row line readout time in a high-density CIS, which makes it possible to operate the CIS at high speed.

Although various embodiments have been described for illustrative purposes, it will be apparent to those skilled in the art that various changes and modifications may be made without departing from the spirit and scope of the invention as defined in the following claims.

What is claimed is:

1. A pixel output level control device comprising:
    a pixel output level control circuit configured to control a pixel output level during a specific period;
    a signal transfer circuit configured to buffer a dummy pixel output signal and transferring the buffered signal; and
    a pixel output level retention circuit configured to maintain the pixel output level during the specific period, according to the dummy pixel output signal from the signal transfer circuit and an inverted cell select signal from the pixel output level control circuit.

2. The pixel output level control device of claim 1, wherein the specific period comprises a period in which a transfer signal is activated and a cell select signal is deactivated.

3. The pixel output level control device of claim 1, wherein the pixel output level control circuit generates an inverted cell select signal and transfers the inverted cell select signal to the pixel output level retention circuit, the inverted cell select signal having an inverted timing with respect to a cell select signal.

4. The pixel output level control device of claim 1, wherein the signal transfer circuit comprises an analog buffer which buffers the dummy pixel output signal outputted from a second source follower circuit included in a dummy pixel and transfers the buffered signal to a drain terminal of a first source follower circuit included in the pixel output level retention circuit.

5. The pixel output level control device of claim 1, wherein the pixel output level retention circuit comprises a plurality of first source follower circuits, each of the first source follower circuits is installed at each column line and operated according to the dummy pixel output signal from the signal transfer circuit and an inverted cell select signal from the pixel output level control circuit.

6. The pixel output level control device of claim 5, wherein each of the first source follower circuits comprises an NMOS-type transistor which has a drain terminal configured to receive the dummy pixel output signal from the signal transfer circuit, a gate terminal configured to receive the inverted cell select signal from the pixel output level control circuit, and a source terminal coupled to the column line.

7. A complementary metal-oxide-semiconductor (CMOS) image sensor (CIS) comprising:
    a pixel array configured to output a pixel signal corresponding to incident light;
    a row decoder configured to select and controlling a pixel within the pixel array for each row line, according to control of a control circuit;
    a pixel biasing circuit configured to bias the pixel signal outputted from the pixel array;
    a ramp signal generator configured to generate a ramp signal according to control of the control circuit;
    a pixel output level control device configured to control and maintaining a pixel output level during a period in which a transfer signal is activated and a cell select signal is deactivated, using an inverted cell select signal and a dummy pixel output signal;
    a comparison circuit configured to compare each pixel signal outputted from the pixel array with the ramp signal provided from the ramp signal generator;
    a counting circuit configured to count a clock applied from the control circuit according to each output signal from the comparison circuit;
    a memory circuit configured to store the counting information provided from the counting unit circuit according to control of the control circuit;
    the control circuit configured to control the operations of the row decoder, the ramp signal generator, the counting circuit, the memory circuit and a column readout circuit; and
    the column readout circuit configured to output data of the memory circuit according to control of the control circuit.

8. The CIS of claim 7, wherein the pixel output level control device comprises:
    a pixel output level control circuit configured to control the pixel output level during the period;
    a signal transfer circuit configured to buffer a dummy pixel output signal and transferring the buffered signal; and
    a pixel output level retention circuit configured to maintain the pixel output level during the period, according to the dummy pixel output signal from the signal transfer circuit and an inverted cell select signal from the pixel output level control circuit.

9. The CIS of claim 8, wherein the pixel output level control circuit generates an inverted cell select signal and transfers the inverted cell select signal to the pixel output level retention circuit, the inverted cell select signal having an inverted timing with respect to a cell select signal.

10. The CIS of claim 8, wherein the signal transfer circuit comprises an analog buffer which buffers the dummy pixel output signal outputted from a second source follower circuit included in a dummy pixel, and transfers the buffered signal to a drain terminal of a first source follower circuit included in the pixel output level retention circuit.

11. The CIS of claim 8, wherein the pixel output level retention circuit comprises a plurality of first source follower circuits, each of the first source follower circuits is installed at each column line and operated according to the dummy pixel output signal from the signal transfer circuit and an inverted cell select signal from the pixel output level control circuit.

12. The CIS of claim 11, wherein each of the first source follower circuits comprises an NMOS-type transistor which has a drain terminal configured to receive the dummy pixel output signal from the signal transfer circuit, a gate terminal configured to receive the inverted cell select signal from the pixel output level control circuit, and a source terminal coupled to the column line.

\* \* \* \* \*